United States Patent
Pal et al.

(10) Patent No.: US 8,958,660 B2
(45) Date of Patent: Feb. 17, 2015

(54) METHOD AND APPARATUS FOR ITERATIVE RECONSTRUCTION

(75) Inventors: Debashish Pal, Waukesha, WI (US); Donghwan Kim, Ann Arbor, MI (US); Jang Hwan Cho, Ann Arbor, MI (US); Jeffrey A. Fessler, Ann Arbor, MI (US); Jean-Baptiste Thibault, Milwaukee, WI (US); Zhou Yu, Waukesha, WI (US); Somesh Srivastava, Waukesha, WI (US); Lin Fu, Niskayuna, NY (US); Bruno Kristiaan Bernard De Man, Clifton Park, NY (US)

(73) Assignees: General Electric Company, Schenectady, NY (US); University of Michigan, Ann Arbor, MI (US)

( * ) Notice: Subject to any disclaimer, the term of this patent is extended or adjusted under 35 U.S.C. 154(b) by 182 days.

(21) Appl. No.: 13/531,255

(22) Filed: Jun. 22, 2012

(65) Prior Publication Data
US 2013/0343673 A1 Dec. 26, 2013

(51) Int. Cl.
G06K 9/32 (2006.01)
G06K 9/00 (2006.01)
G06T 11/00 (2006.01)

(52) U.S. Cl.
CPC ............ G06T 11/003 (2013.01); G06T 11/006 (2013.01); *G06T 2211/408* (2013.01); *G06T 2211/424* (2013.01)
USPC ......................................... 382/298; 382/131

(58) Field of Classification Search
CPC ............ G06T 11/006; G06T 2211/424; G06T 11/003
USPC .......................... 382/131, 298, 300, 305, 312
See application file for complete search history.

(56) References Cited

U.S. PATENT DOCUMENTS

| | | | | |
|---|---|---|---|---|
| 8,121,245 | B2 * | 2/2012 | Pan et al. | 378/2 |
| 8,577,103 | B2 * | 11/2013 | Vija et al. | 382/128 |
| 8,761,478 | B2 * | 6/2014 | Hsieh et al. | 382/131 |

OTHER PUBLICATIONS

Cho et al., "Accelerating Ordered-Subsets Image Reconstruction for X-ray CT Using Double Surrogates", Proceedings of SPIE, vol. No. 8313, Feb. 23, 2012.
Kim et al., "Improved Ordered Subsets Algorithm for 3D X-ray CT Image Reconstruction", Proceedings of the International Conference on Image Formation in X-ray Computed Tomography, pp. 378-381, Jun. 24, 2012.
Erdogan et al., "Ordered Subsets Algorithms for Transmission Tomography", Physics in Medicine and Biology, vol. No. 44, Issue No. 11, pp. 2835-2851, Nov. 1999.
Unofficial English Translation of NL Search Report & Written Opinion from NL Application No. 2011023 on May 27, 2014.

* cited by examiner

*Primary Examiner* — Kanjibhai Patel
(74) *Attorney, Agent, or Firm* — Dean D. Small; The Small Patent Law Group

(57) ABSTRACT

A method is provided for iteratively reconstructing an image of an object. The method includes accessing measurement data associated with the image, and using a simultaneous algorithm to reconstruct the image. Using the simultaneous algorithm to reconstruct the image includes determining a scaling factor that is voxel-dependent, and applying the voxel-dependent scaling factor to a gradient of an objective function to reconstruct the image.

19 Claims, 12 Drawing Sheets

(a)

(b)

METHOD AND APPARATUS FOR ITERATIVE RECONSTRUCTION

STATEMENT REGARDING FEDERALLY SPONSORED RESEARCH AND DEVELOPMENT

The invention was made with government support under Government Contract Number HL098686 awarded by the National Institutes of Health. The U.S. Government may have certain rights in the invention.

BACKGROUND OF THE INVENTION

The subject matter disclosed herein relates generally to imaging systems, and more particularly, to a method and apparatus for reconstructing an image using iterative techniques.

Traditionally, images have been reconstructed from Computed Tomography (CT) data using direct reconstruction algorithms such as filtered back projection (FBP) or convolution back projection (CBP). Recently, model based iterative reconstruction (MBIR) algorithms have become commercially available for reconstructing CT images. One advantage of MBIR algorithms is that MBIR algorithms can more accurately model the measurements obtained from CT systems. This is particularly true for helical CT systems with multi-slice detectors because helical CT systems produce projection measurements that pass obliquely through the two-dimensional (2D) reconstructed image planes, and the acquired data is inherently noisy. By more accurately modeling these projections, MBIR algorithms can produce reconstructions with higher quality (e.g., resolution), lower noise, and fewer artifacts. As a result, MBIR algorithms may be used as a tool to significantly reduce the dose in CT scans while maintaining the diagnostic image quality.

However, a major challenge of MBIR is the computation time and computational resources required to complete a reconstruction. MBIR algorithms typically reconstruct an image by first forming an objective function that incorporates an accurate system model, statistical noise model, and prior model. With the objective function in hand, the image is then reconstructed by computing an estimate that minimizes the objective function, which is typically performed using an iterative optimization algorithm. Examples of some of such iterative optimization algorithms include iterative coordinate descent (ICD), variations of expectation maximization (EM), conjugate gradients (CG), and ordered subsets (OS). However, because of the complexity of the MBIR objective function and the associated iterative solution, some iterative algorithms may require a relatively high number of iterations to achieve the final estimate. As a result, known iterative algorithms that solve the MBIR objective function may require a relatively large amount of time to reconstruct an image.

BRIEF DESCRIPTION OF THE INVENTION

In one embodiment, a method is provided for iteratively reconstructing an image of an object. The method includes accessing measurement data associated with the image, and using a simultaneous algorithm to reconstruct the image. Using the simultaneous algorithm to reconstruct the image includes determining a scaling factor that is voxel-dependent, and applying the voxel-dependent scaling factor to a gradient of an objective function to reconstruct the image.

In another embodiment, an imaging system includes a detector array and a computer coupled to the detector array. The computer is configured to access measurement data associated with an image of an object, and use a simultaneous algorithm to reconstruct the image. The computer is configured to use the simultaneous algorithm to reconstruct the image by determining a scaling factor that is voxel-dependent and applying the voxel-dependent scaling factor to a gradient of an objective function to reconstruct the image.

In another embodiment, a method is provided for iteratively reconstructing an image of an object. The method includes accessing measurement data associated with the image, and using a simultaneous algorithm to reconstruct the image. The simultaneous algorithm includes computing a gradient of a regularizer function. Using the simultaneous algorithm to reconstruct the image includes storing a plurality of sample gradient values in a look-up table, accessing the sample gradient values in the look-up table, and computing an approximate actual gradient value using the sample gradient values.

In another embodiment, a method is provided for iteratively reconstructing an image of an object. The method includes accessing measurement data associated with the image, and using a simultaneous algorithm to reconstruct the image. The simultaneous algorithm includes computing a gradient of a regularizer function. Using the simultaneous algorithm to reconstruct the image comprises computing an actual gradient at an iteration of the reconstruction of the image, adding a compensation term to the actual gradient, and using the actual gradient and the compensation term as the gradient for a subsequent iteration of the reconstruction of the image.

DETAILED DESCRIPTION OF THE INVENTION

Figure 1:
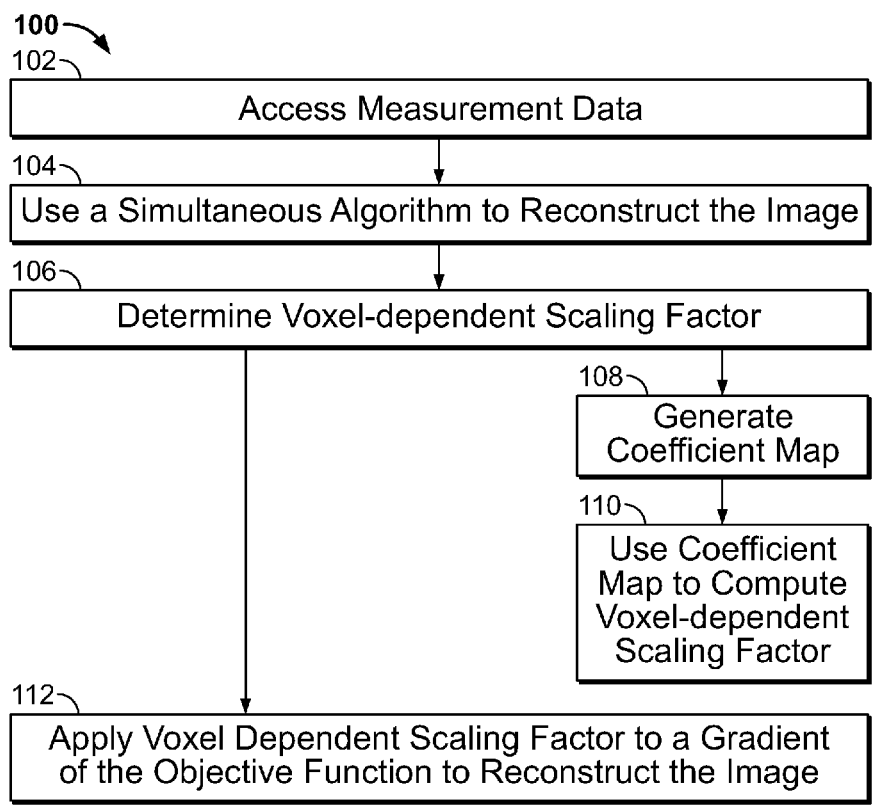
FIG. 1 is a flowchart of an exemplary method for reconstructing an image of an object in accordance with various embodiments.

The foregoing summary, as well as the following detailed description of various embodiments, will be better understood when read in conjunction with the appended drawings. To the extent that the figures illustrate diagrams of the functional blocks of the various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or a block of random access memory, hard disk, or the like) or multiple pieces of hardware. Similarly, the programs may be stand alone programs, may be incorporated as subroutines in an operating system, may be functions in an installed software package, and the like. It should be understood that the various embodiments are not limited to the arrangements and instrumentality shown in the drawings.

Described herein are various embodiments for iteratively reconstructing an image using a simultaneous algorithm. The image is composed of a plurality of image elements. For the purposes disclosed herein, the term "image element" shall refer to an element of an object within the image space array. For example, an image element may include an image pixel or picture element that can correspond to a single voxel or volume element in a two dimensional (2D) or three-dimensional (3D) reconstruction. The image is reconstructed by optimizing an objective function. As used herein, an objective function, or cost function, generally includes a model of the imaging system used to acquire the imaging data, of noise associated with the imaging system, and of the type of image being reconstructed. In the following the terms 'optimize' and 'minimize', 'objective function' and 'cost function' are interchangeable.

Various embodiments provide a novel approach to compute an "adaptive" voxel-dependent scaling factor. The voxel-dependent scaling factor is applied to a gradient of the simultaneous algorithm to reconstruct the image. Various embodiments provide a novel approach to relax (or scale) updates to the image depending on the acquisition (e.g., scanner/recon) geometry. The updates to the image can be relaxed (or scaled) by either appropriate scaling of the gradient or by modifying the step-size applied to the gradient to compute the image update. The step size is typically a scaler applied to the gradient. Computing the optimal step-size may lead to optimal convergence. Various embodiments provide novel ideas for reducing the amount of time of computing the gradient of a regularizer function without impacting the monotonicity of an underlying montonic algorithm. At least one technical effect of various embodiments is reduced transients and improved image quality for a fixed computation time. At least one technical effect of various embodiments is faster convergence to the solution of the original cost function in fewer iterations than with conventional simultaneous algorithms. For example, various embodiments may converge to similar values of a convergence metric for acceptable image quality in five to ten iterations as compared to 50 or 100 iterations required by conventional algorithms published in the art.

There has been significant interest in developing model-based iterative reconstruction (MBIR) algorithms for computed tomography (CT) imaging as MBIR algorithms have been demonstrated to improve the image quality by reducing noise and improving resolution. MBIR algorithms typically work by first forming a cost function that involves a data statistics model, a system model describing the system geometry, and a prior model describing the desirable properties of the reconstructed image. Because the cost function is typically too complex to allow direct reconstruction of the image from the measurement in one pass, the image is estimated by minimizing the cost function in several steps. Hence, iterative optimization algorithms are required to solve such model-based cost functions and are called MBIR algorithms.

Let $\mu \in R^N$ be the image and $y \in R^M$ be the measured projection data. The maximum a posteriori (MAP) estimation problem can be formulated as the sum of data log-likelihood term, L, and a prior term, R. The log-likelihood term is formulated based on the statistics of the data and the system geometry. The prior term ensures that the image estimates belong to certain probability density function (pdf) and $\beta$ is the prior scaling, or prior strength, with which this constraint needs to be applied.

$$\Phi(\mu) = -\Phi_L(y, \mu) + \beta \Phi_R(\mu) \quad (1)$$

$$\hat{\mu} = \underset{\mu \geq 0}{\arg\min} \Phi(\mu) \quad (2)$$

There can be several choices of the log-likelihood term L depending on the model of data-statistics. One such choice of L is a quadratic form leading to:

$$\Phi_L(y,\mu) = \|y - A\mu\|_W^2, \quad (3)$$

where W is a M×M diagonal matrix computed as the approximate inverse of the variance of the measured data, and $A \in R^{M \times N}$ is the system geometry model. One end of the spectrum of iterative optimization algorithms is iterative coordinate descent (ICD). ICD updates one image element (termed as "voxel") at a time while keeping all other voxels fixed, creating a sequence of one-dimensional (1D) problems wherein the gradient of the cost function is updated after every voxel update. Computing the updates to the gradient and Hessian of a 1D cost function is relatively trivial, and ICD has relatively fast convergence speed, provided a good set of initial conditions. Non-homogenous ICD (NH-ICD), a variant of ICD, updates certain voxels more often than others leading to faster convergence. The voxels are chosen based on a map and the map is computed using historical information of all the updates. Non-homogenous ICD is based on the observation that the voxels with large updates are the furthest away from the PWLS solution and hence require more frequent updates. However, ICD (and variants thereof) are challenging to parallelize relatively efficiently and relatively massively on highly parallelizable compute platforms.

On the other end of the spectrum of iterative optimization algorithms are simultaneous algorithms. As used herein, a "simultaneous algorithm" is an algorithm that updates two or more voxels simultaneously. Moreover, the term "optimization" is synonymous with "update" in the context of an iterative algorithm for reconstructing an image. Simultaneous algorithms for MBIR may solve an N dimensional problem at each step. Simultaneous algorithms are amenable to parallelization on relatively highly parallel compute platforms. One iteration of such algorithms can be computationally faster than ICD, but simultaneous optimization algorithms usually take significantly more iterations to converge than ICD. Hence, the challenge is to find an optimization algorithm that both converges relatively fast and is amenable to relatively efficient parallelization.

Most iterative algorithms for finding a minimizer of penalized likelihood function $\Phi$ use the gradient $\nabla\Phi$ of the likelihood function $\Phi$. Many such algorithms can be written in the following form:

$$\mu^{n+1}=\mu^n+\alpha_n D(\mu^n)\nabla\Phi(\mu^n), \quad (4)$$

where $\alpha_n>0$ is the relaxation factor (or step size) and where the N×N matrix $D(\mu)$ is a voxel-dependent scaling matrix. The scaling matrix $D(\mu)$ may also be referred to herein as a "scaling function" and/or a "scaling factor". D may or may not be diagonal depending on the optimization algorithm. In a conventional gradient-descent algorithm, D is an identity matrix and the proper choice of $\alpha_n$ guarantees convergence, and $\alpha_n$ is computed using a 1D optimization called a line search. However, the relatively slow convergence of gradient descent deems it unattractive for practical purposes. Conjugate gradient (CG) is superior to gradient descent in terms of finding a better search direction. Preconditioning the CG algorithm results in an acceleration of the convergence speed as a function of iteration. The ideal preconditioner is the inverse of the Hessian of the cost function in which case it becomes a Newton's method and can be solved in a single step for quadratic problems. However, for tomographic problems, the Hessian is spatially invariant and is relatively large and relatively difficult to invert. Explicit diagonal and circulant approximations have been proposed for the Hessian of the cost function. Implicit preconditioners can also be derived.

The problem can also be solved using principles of optimization transfer and constructing a surrogate function $\phi(.; \mu^n)$ that is easier to maximize to compute $\mu^{n+1}$ by using the current iterate $\mu^n$. The surrogate function is constructed to have the following properties:

$$\Phi(\mu)\leq\phi(\mu,\mu^n);$$

$$\Phi(\mu^n)=\phi(\mu,\mu^n)|_{\mu=\mu^n};$$

$$\nabla\Phi(\mu)|_{\mu=\mu^n}=\nabla^{1\theta}\phi(\mu,\mu_n)|_{\mu=\mu^n}. \quad (5)$$

Optimization transfer algorithms such as separable paraboloidal surrogate (SPS) algorithm, alternating minimization algorithms, and expectation maximization algorithms use a surrogate function.

"Block-iterative" methods (also called "ordered-subsets" method) have been proposed. Such algorithms may significantly accelerate the convergence of many simultaneous algorithms with proper block-dependent scaling. Ordered subset algorithms use range decomposition of the forward projector to accelerate the underlying algorithm. Each subset consists of a subset of the data and acceleration is achieved by approximating the full gradient using the subset of the data. This leads to acceleration roughly by the number of subsets. However, ordered subset accelerated algorithms are not monotonic and enter an undesirable limit cycle. The magnitude of the limit cycle depends on the number of subsets, and larger subsets lead to larger limit cycle. A larger limit cycle is undesirable and may lead to significant deviation from the actual desired solution when the algorithm is terminated.

The simultaneous as well as the "block-iterative" methods are typically highly parallelizable but may lack the flexibility of influencing the updates based on historical information as proposed in NH-ICD. Such algorithms usually have relatively fast low-frequency convergence and relatively slow high-frequency convergence. It has been noted that NH-ICD significantly speeds up the convergence of the baseline ICD algorithm by updating more often the voxels that are further away from convergence. In the method 100 shown in FIG. 1, a novel approach to compute an "adaptive" voxel-dependent scaling factor $D(\mu)$ (Equation 4) for the updates is discussed leading to faster convergence than the conventional gradient-based optimization algorithms. In known reconstruction methods, the term "rescaling" D has been used to accelerate the convergence of "block-iterative" algorithms, but the rescaling factor is a fixed factor determined by geometry, does not change with iteration index, and is not adaptive to the data. In the methods described and/or illustrated herein, the proposed scaling factor can be adaptive to the data, change with iteration number, and be computed based on factors such as historical updates, acquisition geometry, data values, image features, and/or the like.

In geometries like helical CT, the voxels are not sampled uniformly by the scanning trajectory. Typically, a three-dimensional (3D) region-of-interest (ROI) is reconstructed that is prescribed by the user. The number of views is determined by the ROI and the voxels outside the ROI may be sampled by fewer projection views than voxels inside the ROI. During the convergence process, these voxels may exhibit significant transient artifacts and hurt the image quality of intermediate estimates. In the method 200 shown in FIG. 5, a novel approach to relax (or scale) the updates, $\mu^{n+1}-\mu^n$, (see Equation 4) depending on the acquisition geometry is described and illustrated. The updates can be relaxed (or scaled) by either appropriate scaling of the gradient $\nabla\Phi$ or by modifying the step-size $\alpha_n$. The method 200 may reduce transients and improve image quality. Different schemes have been proposed for the relaxation factor $\alpha_n$ in the literature for "block-iterative" algorithms to ensure convergence. However, the scaling factor in that context is an iteration-dependent sequence of scalars. The scaling factors described herein are spatially varying values that may depend on factors such as acquisition geometry, historical updates, data values, image features, and/or the like.

Referring to Equations 1 and 4, the iterative optimization algorithms for the MBIR cost function require that the gradient of the regularizer $R(\mu)$ be computed at each iteration. The regularization function typically consists of power, logarithm, and trigonometric functions. Therefore, the time required to compute the gradient of the regularizer can be significant. In the methods 300 and 400 shown in FIGS. 8 and 9, respectively, novel ideas are presented to reduce the time to compute the regularizer gradient without impacting the monotonicity of an underlying monotonic algorithm, or the convergence speed of the optimization of the algorithm.

In the method 100 shown in FIG. 1, various approaches are discussed that can be used to efficiently construct an "adaptive" voxel-dependent map used for scaling the diagonal matrix $D(\mu)$ in Equation 4 leading to further acceleration of iterative optimization algorithms for the MBIR cost function. Several ideas are discussed to improve the adaptivity of the map and also to construct the map more efficiency. An example of rescaling the diagonal matrix $D(\mu)$ using the voxel-dependent map is shown using an ordered-subsets SPS (OS-SPS) algorithm.

Figure 5:
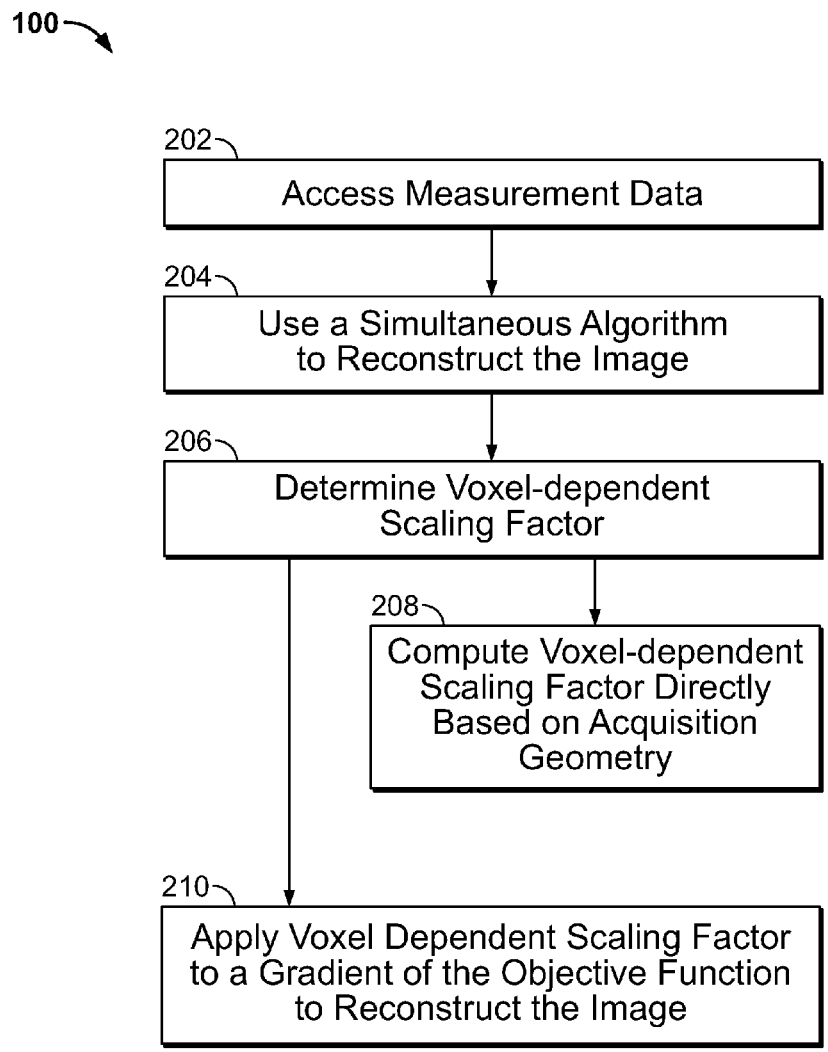
FIG. 5 is another flowchart illustrating an exemplary method of reconstructing an image of an object in accordance with various embodiments.

In the method 200 shown in FIG. 5, techniques to properly relax (or scale) the updates $(\mu^{n+1}-\mu^n)$ are described leading to reduced transients and improved image quality. An example of computing an appropriate relaxation (or scaling) factor using the acquisition geometry is described for the OS-SPS algorithm.

FIG. 1 is a flowchart of the exemplary method 100 for iteratively reconstructing an image of an object. Measurement data that is associated with the image is acquired using an exemplary imaging system. At 102, the method 100 includes accessing the measurement data. At 104, a simultaneous algorithm is used to reconstruct the image. Using at 104 the simultaneous algorithm to reconstruct the image includes determining, at 106, a scaling factor $D(\mu)$ that is voxel-dependent. In the exemplary embodiment of method 100, the scaling factor is determined at 106 by generating, at 108, a coefficient map. It has been noted by Thibault and others that updating more frequently the voxels that are further away from the solution can accelerate convergence. Hence, such voxels need to be identified and the "coefficient map" should consist of such voxels. In NH-ICD, the coefficient map can be directly incorporated to choose the update order of the voxels. For simultaneous algorithms, the diagonal scaling matrix $D(\mu)$ can be modified to incorporate the coefficient map. Care should be taken to ensure that the monotonicity of the algorithms is not altered.

A natural choice for such an coefficient map is the difference of at least two iterations or at least two sub-iterations. The at least two iterations or sub-iterations may or may not be consecutive. In one embodiment, the coefficient map is the difference of two consecutive iterations, which is given by $$\mu_j^n = |\mu_j^{n+1} - \mu_j^n|_1. \tag{6}$$

The difference in Equation 6 should highlight the voxels that are changing the most and hence likely to be further away from the solution. This difference changes with iteration. Hence, the coefficient map can be a function of iteration as well be as adaptive to the data. The coefficient map $\mu_j^n$ can be transformed based on the histogram of the difference in Equation 6. The transformation may be discrete or continuous. The ideal map is locally smooth and hence the final map can be low-pass filtered from an intermediate map. However, the coefficient map may not be available until one full iteration is over, hence an initial coefficient map can be generated from the initial image. The initial image is typically reconstructed using the filtered back-projection (FBP) algorithm, but the choice is not limited to FBP. The initial map can be generated using an edge or an intensity detector on the initial image, or both, and also depend on the scan geometry. The edge and intensity detector may be a reasonable choice for improving high-frequency convergence, assuming the initial image has a decent low-frequency content.

The coefficient map provides a sound framework to adaptively choose the scaling for the image volume. The decision to construct the coefficient map can be augmented using several factors such as, but not limited to, prior knowledge about the initial image, information about the acquisition geometry, image features such as features of the current image (such as, but not limited to, edges, homogeneous regions, and/or the like), and/or the like. For instance, FBP algorithm exhibit artifacts due to truncation of the scanned object outside the scan field of view and this information can be utilized to further scale the updates in the truncated region. Another example is motivated from the fact that the simultaneous algorithms have relatively slow high-frequency convergence. Hence, the coefficient map $\mu_n$ at every iteration index can be augmented with a map obtained from a high-pass filtered image of $\mu_n$.

Figure 2:
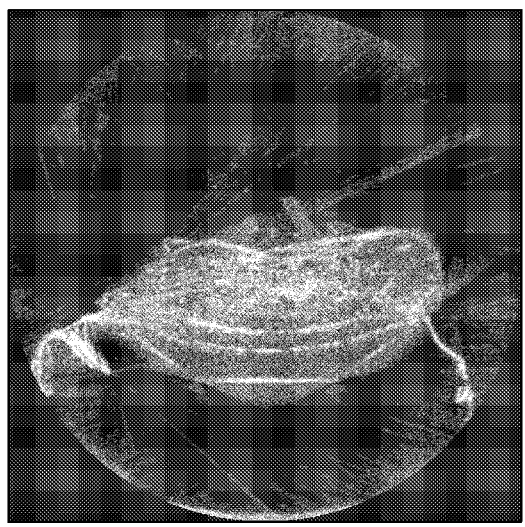
FIG. 2 is a visual representation of an exemplary coefficient map generated using the method shown in FIG. 1.
Figure 2:
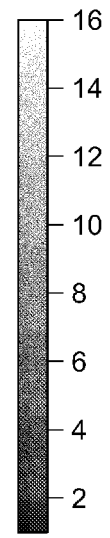

An example of an coefficient map $\mu_j^4 : \mu_j^n$ is shown in FIG. 2, wherein the coefficient map is discretized using the histogram of the map. The largest 5% voxels are assigned a value of 16, and the next 10%, 20%, and 40% voxels are assigned values of 8, 4, and 2, respectively. The rest of the voxels are assigned a value of 1, followed by low-pass filtering. Adaptively scaled SPS updates makes larger updates to the voxels that are bright in that figure, whereas ordinary SPS updates all voxels equivalently.

Referring again to FIG. 1, after the generation of coefficient map, the coefficient map is used to influence the diagonal scaling matrix $D(\mu)$. Accordingly, the method 100 includes using, at 110, the coefficient map to compute the voxel-dependent scaling factor $D(\mu)$. Once the voxel-dependent scaling factor $D(\mu)$ has been determined, the method 100 includes applying, at 112, the voxel-dependent scaling factor $D(\mu)$ to the gradient $\nabla\Phi$ of the objective function to reconstruct the image.

The coefficient map should influence the voxel-dependent scaling factor $D(\mu)$ without impacting the monotonicity of the original algorithm. It is less of a concern in when the original algorithm is not monotonic, for example the "block-iterative" algorithms. A practical aspect that should not be ignored is the efficiency of incorporating the coefficient map to scale the diagonal scaling matrix in the implementation. Some possible ideas are described below.

The idea of utilizing the coefficient map to scale the diagonal scaling matrix $D(\mu)$ can be utilized for most of the simultaneous algorithms, such as, but not limited to, CG algorithms with implicit or explicit preconditioners. An exemplary OS-SPS algorithm that illustrates one embodiment of the method 100 will now be described. The OS-SPS algorithm is one example of rescaling a diagonal matrix $D(\mu)$ using a voxel-dependent coefficient map.

The penalized weighted least square cost function is written as:

$$L(y, \mu) = -\frac{1}{2}\sum_{i=1}^{M} w_i(y_i - [A\mu]_i)^2 + \beta\sum_{r=1}^{K} \Psi_r([C\mu]_r), \tag{7}$$

$$K = 13 \times N, C \in R^{K \times N}$$

$$= \frac{1}{2}\sum_{i=1}^{M} q_i([A\mu]_i) + \beta\sum_{r=1}^{K} \Psi_r([C\mu]_r)$$

where, y is the projection data with M elements, w is the statistical weighting matrix, A is the system matrix, $\mu$ is the image with N elements, C is the finite differencing matrix, and $\Psi$ is any Markov random field (MRF) prior that includes directional coefficients. The separable surrogate algorithm is motivated from the convex decomposition lemma proposed by De Pierro and allows relatively easy inversion of the Hessian of the surrogate function and relative ease in incorporating the non-negativity constraint. The surrogate for the data fit term and the regularization term can be derived using the following transformations:

$$[A\mu]_i = \sum_{j=1}^{N} a_{ij}\mu_j = \sum_{j=1}^{N} \pi_{ij}^n\left[\frac{a_{ij}}{\pi_{ij}^n}(\mu_j - \mu_j^n) + [A\mu^n]_i\right] \tag{8}$$

$$[C\mu]_i = \sum_{j=1}^{N} c_{rj}\mu_j = \sum_{j=1}^{N} \pi_{rj}^n\left[\frac{c_{rj}}{\pi_{rj}^n}(\mu_j - \mu_j^n) + [C\mu^n]_r\right]$$

where $$\sum_{j=1}^{N} \pi_{ij}^{n} = 1 \text{ and } \sum_{j=1}^{N} k_{ij}^{n} = 1.$$

Using Equation 8, the surrogate can be constructed as:

$$q_i([A\mu]_i) <= Q_i(\mu, \mu^n) = \sum_{j=1}^{N} \pi_{ij}^n q_i\left(\left[\frac{a_{ij}}{\pi_{ij}^n}(\mu_j - \mu_j^n) + [A\mu^n]_i\right]\right) \quad (9)$$

$$\Psi_r([C\mu]_r) <= R_r(\mu, \mu^n) = \sum_{j=1}^{N} \kappa_{rj}^n \Psi_r\left(\left[\frac{c_{rj}}{\kappa_{rj}^n}(\mu_j - \mu_j^n) + [C\mu^n]_r\right]\right).$$

Using $$\pi_{ij} = \frac{a_{ij}}{\sum_j a_{ij}}$$

and maximum curvature for the surrogate of the regularizer, leads to one form of the SPS algorithm that can be written as:

$$\mu_j^{n+1} = \mu_j^n - \frac{\sum_{i=1}^{M} \nabla q_i([A\mu^n]_i) + \sum_{r=1}^{K} \nabla \Psi_r([C\mu^n]_r)}{d_j^{Q,n} + d_j^{R,n}} \quad (10)$$

$$d_j^{Q,n} = \sum_i a_{ij} w_i \sum_j a_{ij}$$

$$d_j^{R,n} = \sum_r c_{rj} \nabla^2 \Psi_r(0) \sum_j c_{rj}$$

In Equation 10, the diagonal scaling matrix is the inverse of the Hessian of the surrogate cost function (Equation 9). The Hessian is a diagonal matrix and hence can be relatively easily inverted. The choice of this scaling matrix makes it dependent only on both data statistics and geometry. Hence, the scaling matrix is fixed and does not change with iteration index.

The non-uniform map $\mu_j$ can be incorporated in the scaling matrix by modifying $\pi_{ij}$ and $\kappa_{rj}$. Using $$\pi_{ij} = \frac{a_{ij} u_j}{\sum_j a_{ij} u_j} \text{ and } K_{rj} = \frac{c_{rj} u_j}{\sum_j c_{rj} u_j},$$

the updates for SPS with non-uniform updates (NU-SPS) can be written as:

$$\mu_j^{n+1} = \mu_j^n - \frac{\sum_{i=1}^{M} \nabla q_i([A\mu^n]_i) + \sum_{r=1}^{K} \nabla \Psi_r([C\mu^n]_r)}{d_j^{Q,n} + d_j^{R,n}} \quad (11)$$

$$d_j^{Q,n} = \frac{\sum_i a_{ij} w_i \sum_i a_{ij} u_j}{u_j}$$

$$d_j^{R,n} = \frac{\sum_r c_{rj} \nabla^2 \Psi_r(0) \sum_j c_{rj} u_j}{u_j}$$

Figure 3:
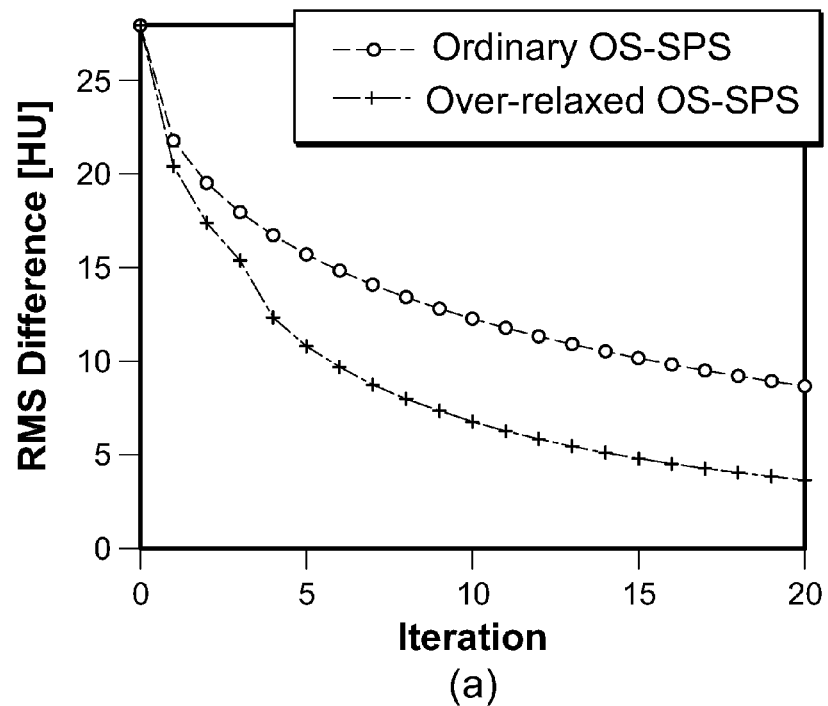
FIG. 3 is a graph illustrating an exemplary convergence of an exemplary ordered subset separable paraboloidal surrogate (OS-SPS) algorithm associated with the method of FIG. 1.
Figure 3:
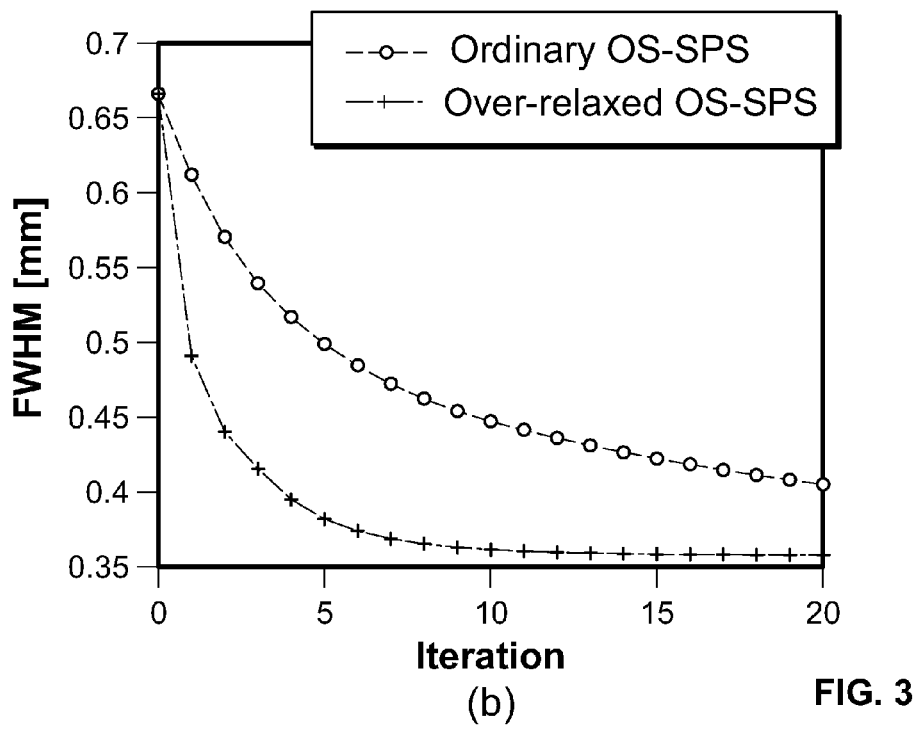
Figure 4:
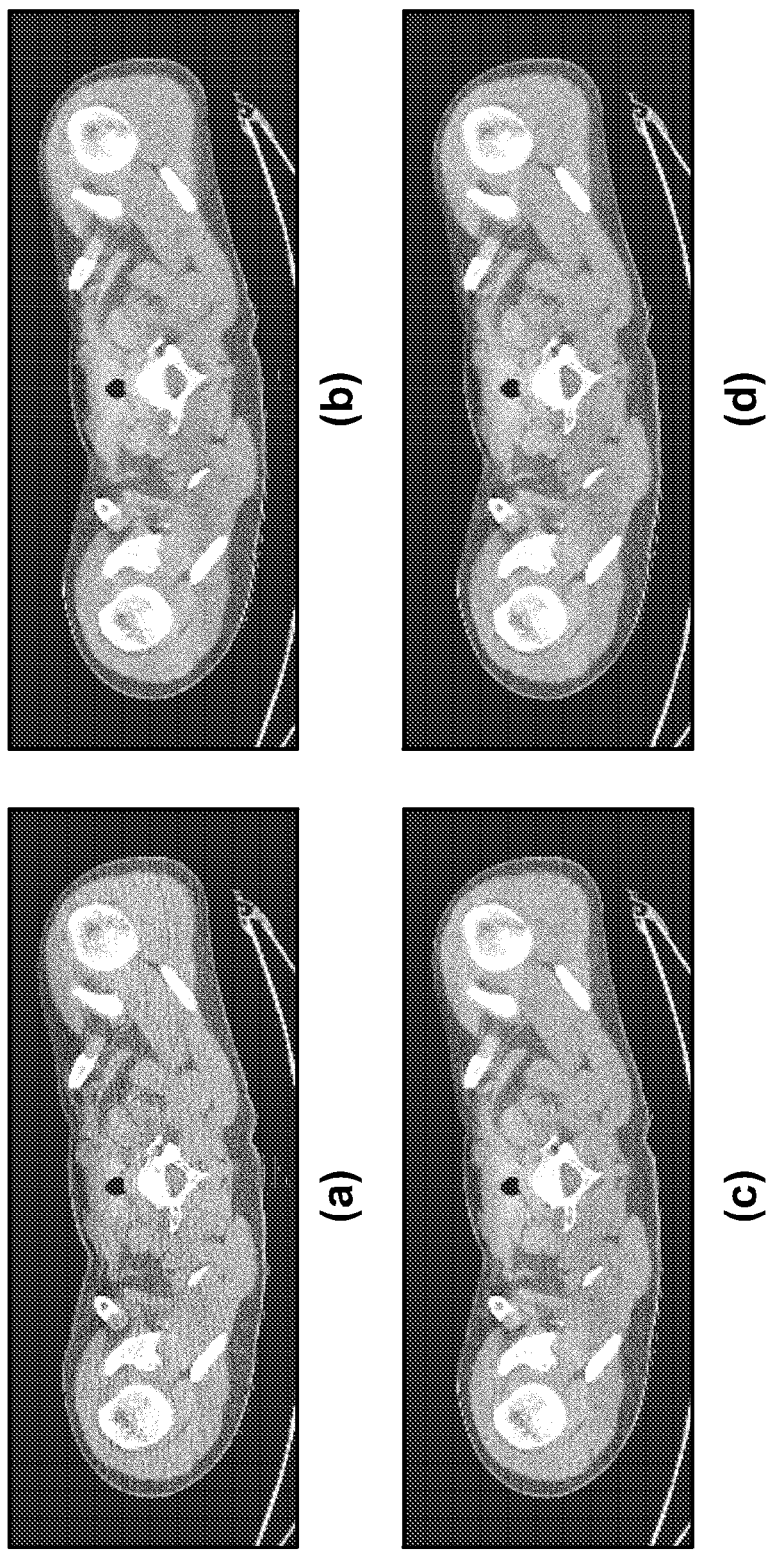
FIG. 4 is a visual representation of a variety of images generated using the exemplary OS-SPS algorithm of FIG. 3.

The inclusion of $\mu_j$ leads to an adaptive $d_j^n$ that is iteration dependent and can adapt to the data. Equation 11 uses one full forward and back-projection to compute $d_j^n$ using the coefficient map $\mu_j^n$. FIG. 3(a) plots the root mean squared (RMS) difference (in HU) from the converged image versus iteration with patient data, and it shows that the adaptive scaling of the diagonal matrix accelerates the convergence rate about three times. FIG. 4 also confirms that the reconstructed image with the new scaling matrix is closer to the converged image than that without the new scaling. FIG. 4(a) illustrates an initial FBP image. FIG. 4(b) illustrates the converged image. FIGS. 4(c) and 4(d) illustrate reconstructed images after 20 iterations by (c) ordinary OS-SPS (82 subsets) and (d) adaptively scaled OS-SPS (82 subsets). Moreover, FIG. 3(b) shows that the convergence rate of high frequency components are accelerated by more than, three times. (The convergence of high frequency terms are measured by calculating the full-width half maximum (FWHM) of a high-contrast wire.)

A practical aspect that should not be ignored is the efficiency of incorporating the coefficient map to scale the diagonal scaling matrix. The ideas are implementation specific and may vary from one algorithm to another. Some possible ideas of reducing the computations are:

1. The frequency of computing the coefficient map can be reduced and it can be computed every few iterations (e.g., every n-th iteration) instead of every iteration.
2. The coefficient map can be downsampled to reduce the time for forward and back-projection. The coefficient map is locally smooth and hence downsampling may not significantly influence the convergence.
3. The updates in Equation 11 require computing the gradient $\nabla q_i$ which requires forward and back-projection. The forward and back-projection to compute $\pi_{ij}$ can be simultaneously performed with the gradient calculation. This may reduce the overhead of computing the diagonal scaling matrix $D(\mu)$. For example in OS algorithms, the gradient is computed using a partial forward and back-projection. In this case, the new scaling matrix can be computed with the gradient but the full computation of it would require cycling through at least some of the subsets, if not all.

Figure 6:
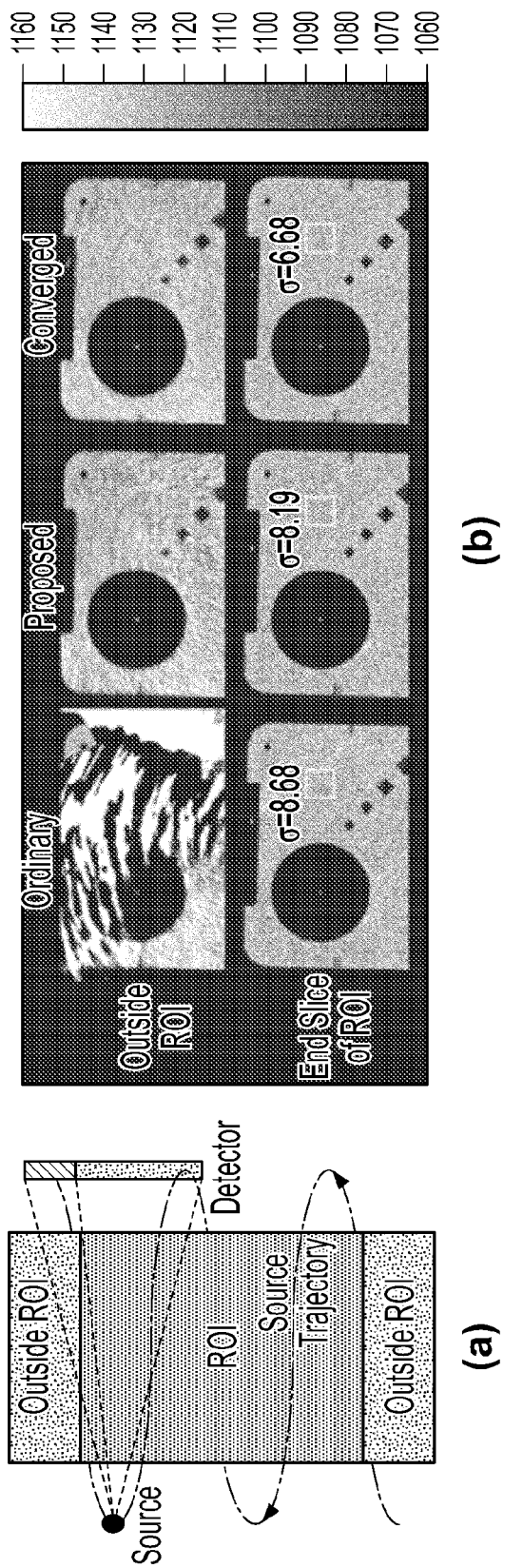
FIG. 6 is a visual representation of exemplary helical geometry and exemplary reconstructed image in the helical geometry.

FIG. 5 is a flowchart of another exemplary method 200 for iteratively reconstructing an image of an object. In some acquisition geometries, such as multislice helical CT, the image volume is non-uniformly sampled. As shown in FIG. 6 (b), the voxels inside the three-dimensional region-of-interest (3D-ROI) are sampled by more projection views compared to the voxels outside the ROI. These undersampled voxels may significantly slow down the convergence of algorithms and lead to transitory artifacts, if the updates to the current image (Equation 4) are not scaled appropriately.

Referring again to FIG. 5, measurement data that is associated with the image is acquired using an exemplary imaging system. At 202, the method 200 includes accessing the measurement data. The measurement data being non-uniformly sampled in a 3D acquisition geometry. At 204, a simultaneous algorithm is used to reconstruct the image. Using at 204 the simultaneous algorithm to reconstruct the image includes determining, at 206, a scaling factor $D(\mu)$ that is voxel-dependent. In the exemplary embodiment of the method 200, the voxel-dependent scaling factor is constructed based on the acquisition geometry. Accordingly, at 208, the method 200 includes computing the voxel-dependent scaling factor directly based on the acquisition geometry.

Once the voxel-dependent scaling factor $D(\mu)$ has been determined, the method 200 includes applying, at 210, the voxel-dependent scaling factor $D(\mu)$ to the gradient $\nabla \Phi$ (see Equation 4) of the objective function to reconstruct the image. The gradient $\nabla \Phi$ may be scaled or the step-size $\alpha_n$ may be modified for stability. For example, in some embodiments, applying at 210 the voxel-dependent scaling factor to the gradient includes scaling the gradient using the voxel-dependent scaling factor. The scaling may be obtained using $A^TWA$ (see Equation 15). The scaling may be linked to contribution of the subsets to every voxel leading to suitable scaling of the updates. In other embodiments, applying at 210 the voxel-dependent scaling factor to the gradient includes computing a relaxation factor for each slice of the image data. Sampling of the image volume is non-uniform and slices inside the ROI are sampled by more views compared to slices outside the ROI. The step-size (or relaxation factor) usually is a scalar but may be modified to be a vector for each slice. This may enable relaxing the slices outside the ROI more than the slices inside the ROI. However, this may increase the dimension of the search space for $\alpha$ and increase the compute time.

The idea of relaxing (or scaling) the updates for under-sampled voxels is applicable for all simultaneous algorithms. An exemplary OS-SPS algorithm that illustrates one embodiment of the method 200 will now be described. The OS-SPS algorithm is one example of the construction of the scaling factor and utilization of the scaling factor to scale the gradient $\nabla \Phi$.

The update for the SPS algorithm can be written using Equation 10:

$$\mu_j^{n+1} = \mu_j^n - \frac{\sum_i a_{ij} w_j \left( \sum_j a_{ij} \mu_j^n - y_i \right) + \beta \sum_r \nabla \Phi_r \left( \sum_j c_{rj} \mu_j^n \right)}{d_j}, \quad (12)$$

where $d_j$ is the scaling function (see Equation 4) that is determined from the Hessian of the surrogate cost function. $d_j$ consists of the data-fit term and the regularizer term described in Equation 10. Now in OS-SPS, the gradients are calculated using the subset of views and one full iteration corresponds to cycling through all the S number of subsets. Each iteration involves multiple sub-iterations and each sub-iteration requires computing the gradient of regularizer and the data-fit term using subset of the data. The OS-SPS updates can be written as:

$$\mu_j^{n,s+1} = \qquad \qquad (13)$$

$$\mu_j^{n,s} - \frac{\gamma_j^{n,s} \sum_i a_{i_s,j} w_{i_s} \left( \sum_j a_{i_s,j} \mu_j^{n,s} - y_{i_s} \right) + \beta \sum_r \nabla \Phi_r \left( \sum_j c_{rj} \mu_j^n \right)}{d_j},$$

where s denotes the subset index and n denotes the iteration index. If properly scaled the gradient computed using the subset of views can match the gradient computed using all views. This will speed up the convergence by a factor of S compared to the original SPS algorithm. However this ideal scaling factor, $$\gamma_j^{n,s} = \frac{\sum_{i_s} a_{i_s,j} w_{i_s} \left( \sum_j a_{i_s,j} \mu_j^{n,s} - y_{i_s} \right)}{\sum_i a_{ij} w_i (\sum_j a_{ij} \mu_j^{n,s} - y_i)}, \quad (14)$$

is impractical to compute. The conventional practical implementation of OS-SPS is to use a constant scaling factor $\gamma_j^{n,s}=S$ that corresponds to the number of subsets. However, this choice works poorly when the ideal scaling factor $\gamma_j^{n,s}$ is significantly non-uniform. This non-uniformity in the scaling can cause the algorithm to have significant transitory artifacts that are not desirable. One of the reasons for the non-uniformity can be the geometry of the acquisition. The geometry of the acquisition can lead to non-uniform sampling of the image volume. A voxel-dependent scaling to the gradient can be developed based on the geometry of the acquisition. One such choice of the non-uniform map is, $$\gamma_j = \sum_{s=1}^{S} I_{\left\{ \sum_{i_s} a_{i_s,j} w_{i_s} \left( \sum_j a_{i_s,j} \right) > 0 \right\}}, \quad (15)$$

where $I_{(B)}$ is 1 when B is true and 0 when B is false. In Equation 15, B is true when a given voxel indexed by j receives contributions from views belonging to the subset indexed by s. The non-uniform map and the denominator $$d_j = \sum_i a_{ij} w_i \sum_j a_{ij} = \sum_{s=1}^{S} a_{i_s,j} w_{i_s} \sum_j a_{i_s,j}$$

can be computed simultaneously.

FIG. 6(*b*) shows that the properly scaled OS algorithm provides improved image quality relative to the ordinary OS algorithm that does not converge relatively quickly outside ROI. The instability that appeared outside the ROI, affecting the image quality within the ROI (as seen by the noise standard deviations in FIG. 6(*b*)), has been reduced by the proposed relaxation (or scaling). FIG. 6(*a*) illustrates a diagram of helical geometry. A dashed region indicates the detector that acquires measurement data that receives contributions from both voxels in the ROI and voxels outside the ROI. FIG. 6(*b*) illustrates the effect of gradient scaling in the OS-SPS algorithm in helical geometry. Each image is reconstructed after running 30 iterations of the OS algorithm with 328 subsets, using the ordinary and proposed scaling approaches. The standard deviation $\sigma$ of a uniform region (in box) is computed for comparison. (Several iterations of a convergent algorithm are shown as a reference)

Figure 7:
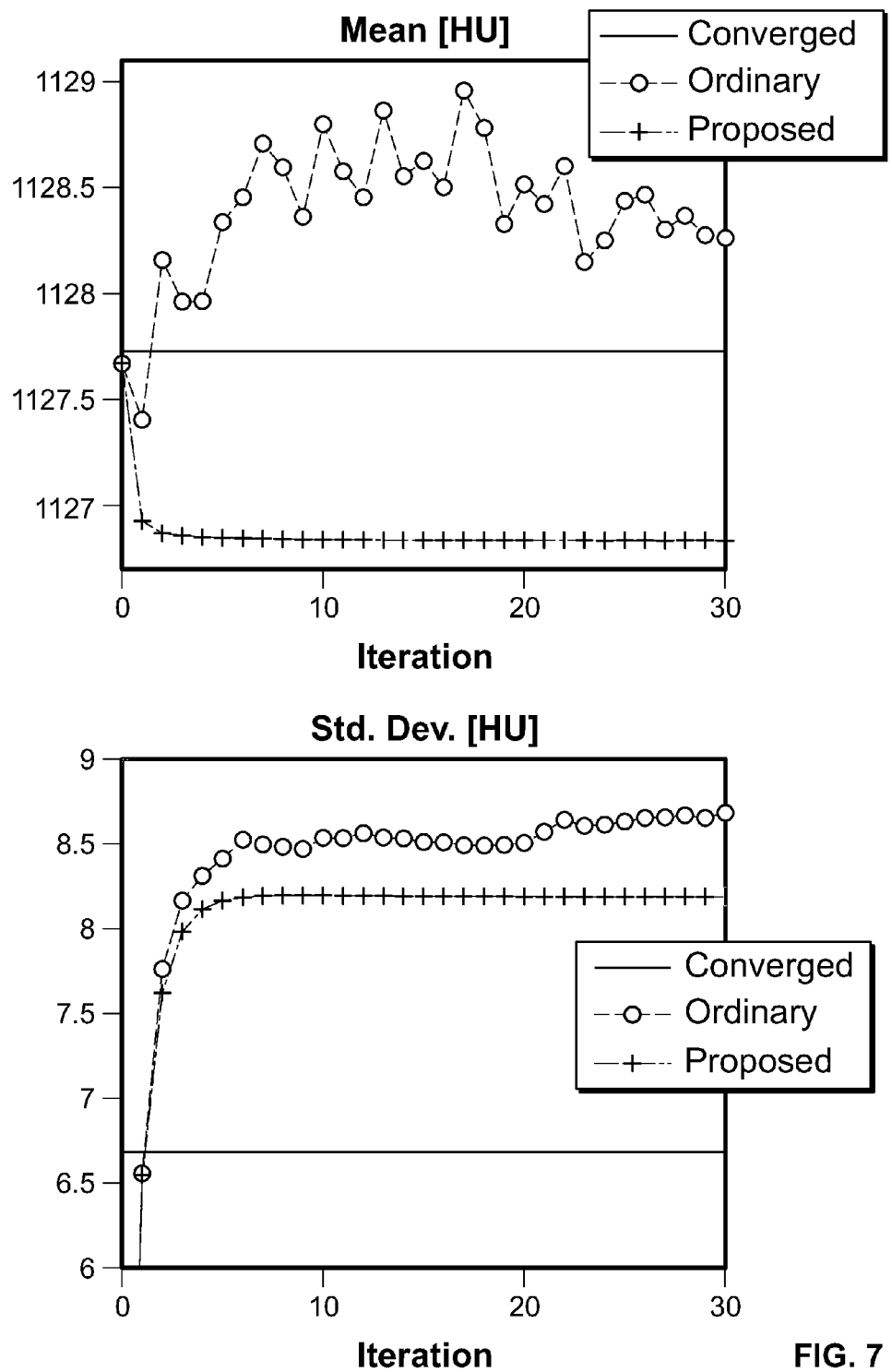
FIG. 7 is a graph illustrating exemplary mean and standard deviations of an OS-SPS algorithm associated with the method of FIG. 5.

FIG. 7 further proves that the properly scaled OS is robust within ROI, whereas the ordinary OS algorithm within the ROI is degraded due to its instability outside the ROI. FIG. 7 illustrates mean and standard deviation within a uniform region of an end slice of the ROI vs. iteration, showing the instability of the ordinary OS approach compared with the proposed OS approach (328 subsets).

Figure 8:
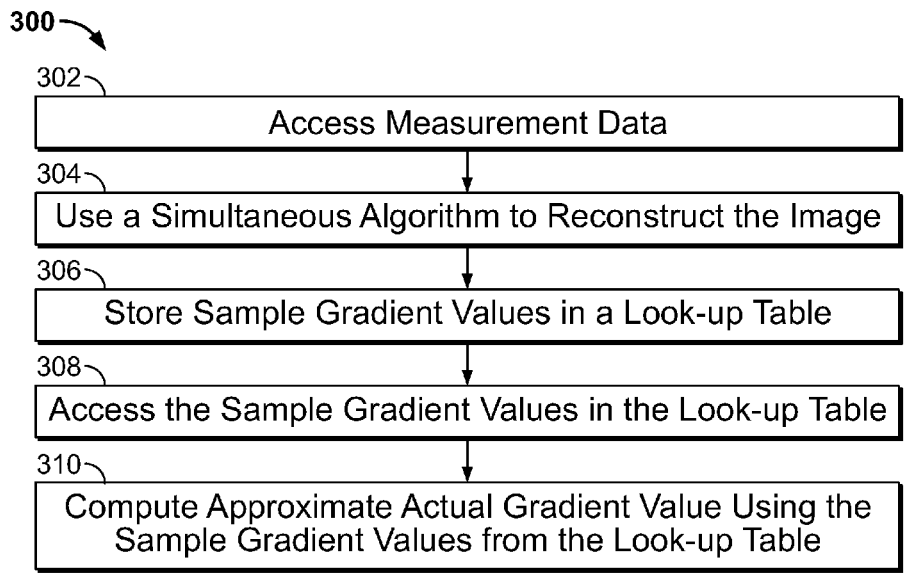
FIG. 8 is another flowchart illustrating an exemplary method of reconstructing an image of an object in accordance with various embodiments.

FIG. 8 is a flowchart of another exemplary method 300 for iteratively reconstructing an image of an object. FIG. 8 illustrates an exemplary embodiment of a regularizer gradient calculation. Iterative optimization algorithms for the MBIR cost function require computing the gradient of the regularizer function for updating the current image estimate (see Equation 4). The time to compute the gradient of the regularizer can be significant depending on the regularizer potential function (I). Most commonly, the potential function includes powers, logarithms and trigonometric functions that involve significant computations. Examples of such potential functions include, but are not limited to:

$$\Phi_R(\mu) = \log(1 + |\mu|^2) \quad (16)$$

-continued $$\Phi_R(\mu) = \log(\cosh(|\mu|)) \quad (17)$$

$$\Phi_R(\mu) = \frac{\frac{1}{2}|\mu|^p}{1 + \left|\frac{\mu}{\delta}\right|^{(p-q)}} \quad (18)$$

To reduce the cost required to compute the gradient of the regularizer function, an approximation of the regularizer gradient $\nabla\Phi_R(\mu)$ can be used based on sample gradient values in a look-up table, as is described in the method 300. Alternatively, as is described in the method 400 of FIG. 9, a surrogate can be constructed for the regularizer function, wherein the gradient of the surrogate can be computed more efficiently than the gradient of the actual regularizer function.

Referring now to the method 300, measurement data that is associated with the image is acquired using an exemplary imaging system. At 302, the method 300 includes accessing the measurement data. At 304, a simultaneous algorithm is used to reconstruct the image. Using at 304 the simultaneous algorithm to reconstruct the image includes storing, at 306, a plurality of sample gradient values in a look-up table. Optionally, storing at 306 includes sampling the gradient values at a fixed sampling frequency. One approach for storing at 306 the sample gradient values in the look-up table would be to sample the values of $\nabla\Phi_R(\mu)$, i.e., to tabulate $d_k=\nabla\Phi_R(\mu_k)$ for k=0, ..., K. If the points $\mu_k=k\Delta$ where $\Delta$ is a positive integer representing the sampling frequency, then the following indexing function for the table can be used (where $\lfloor \cdot \rfloor$ indicates a floor function):

$$\hat{k}(\mu) = \min\left(\left\lfloor \frac{|\mu| + \frac{\Delta}{2}}{\Delta} \right\rfloor, K\right). \quad (19)$$

At 308, the method 300 includes accessing the sample gradient values in the look-up table. An approximate actual gradient value is then computed, at 310, using the sample gradient values from the look-up table. The approximate actual gradient value may be computed at 310 using any interpolation scheme, such as, but not limited to, a linear interpolation scheme, a bi-cubic interpolation scheme, and/or the like. In one embodiment, computing at 310 the approximate actual gradient value includes computing an approximate actual gradient value for each iteration of the reconstruction.

Figure 9:
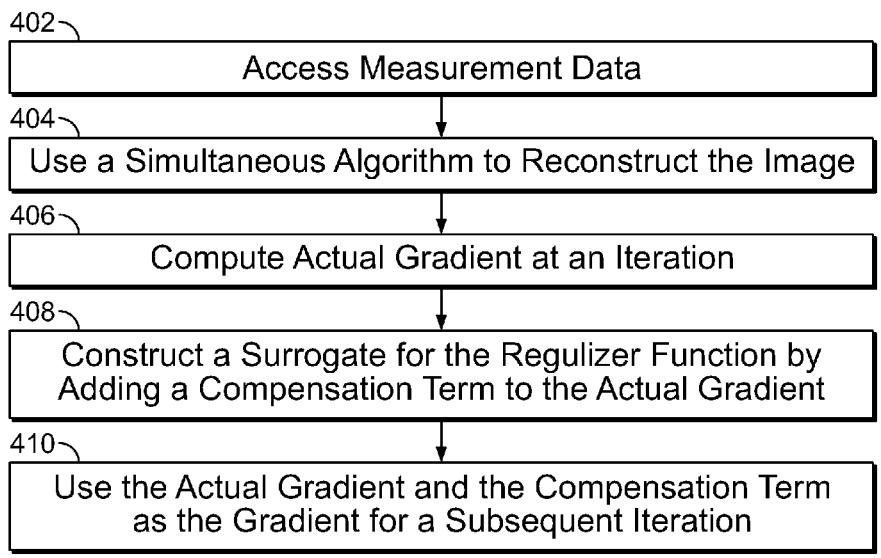
FIG. 9 is another flowchart illustrating an exemplary method of reconstructing an image of an object in accordance with various embodiments.

FIG. 9 is a flowchart of another exemplary method 400 for iteratively reconstructing an image of an object. FIG. 9 illustrates an exemplary embodiment of a regularizer gradient calculation wherein a surrogate is constructed for the regularizer function, as was briefly described above. Measurement data that is associated with the image is acquired using an exemplary imaging system. At 402, the method 400 includes accessing the measurement data. At 404, a simultaneous algorithm is used to reconstruct the image.

Using at 404 the simultaneous algorithm to reconstruct the image includes computing, at 406, an actual gradient at an iteration of the reconstruction of the image. The surrogate for the regularizer function is then constructed, at 408 by adding a compensation term to the actual gradient. The compensation term may consist of relatively simple mathematical operations. For example, in some embodiments, the compensation term only includes at least one of addition, subtraction, division, and/or multiplication.

The actual gradient and the compensation term are then used, at 410, as the gradient for a subsequent iteration of the reconstruction of the image. For each subsequent iteration of the reconstruction of the image, the actual gradient computed at 406 is added to a different compensation term for use as the gradient for the particular subsequent iteration. In one embodiment, the gradient used at 410 for a particular iteration is used as the gradient for all sub-iterations of the particular iteration. In other words, in some embodiments, the gradient used at 410 for a particular iteration is not recomputed for the sub-iterations of the particular iteration, but rather is reused for each sub-iteration of the particular iteration.

The idea of a surrogate is applicable to any simultaneous reconstruction algorithm. An exemplary OS-SPS algorithm that illustrates one embodiment of the method 400 will now be described. The OS-SPS algorithm uses a surrogate for the data-fit term and the regularizer term. Another surrogate is introduced on top of the existing surrogate for the regularizer to minimize the compute time for the gradient calculation, hence the OS-SPS algorithm may be referred to as an "Ordered-subsets with Double Surrogates" algorithm.

Consider a general PL objective function of the form:

$$\Phi(\mu)=\Phi_L(\mu)+\Phi_R(\mu), \quad (20)$$

where $\Phi_L$ is the data fit term and $\Phi_R$ is the regularizer. It is assumed that the data fit term $\Phi_L$ has a quadratic surrogate of the form:

$$\Phi_L(\mu) \leq \phi_L(\mu; \tilde{\mu}) = \quad (21)$$

$$\Phi_L(\tilde{\mu}) + \nabla\Phi_L(\tilde{\mu})(\mu - \tilde{\mu}) + \frac{1}{2}(\mu - \tilde{\mu})'D_L(\tilde{\mu})(\mu - \tilde{\mu}), \forall \tilde{\mu},$$

with an appropriate diagonal matrix $D_L$. A typical choice is $D_L=\text{diag}(d_j^{Q,n})$. It is also assumed that the regularizer $\Phi_R(\mu)$ has a quadratic surrogate of the form:

$$\Phi_R \leq \phi_R(\mu; \bar{\mu}) = \Phi_R(\bar{\mu}) + \nabla\Phi_R(\bar{\mu})(\mu - \bar{\mu}) + \frac{1}{2}(\mu - \bar{\mu})'D_R(\bar{\mu})(\mu - \bar{\mu}), \quad (22)$$

$$\forall \bar{\mu},$$

with an appropriate diagonal matrix $D_L$. A typical choice is $D_R(\mu)=\text{diag}(d_j^{R,n})$. Then we define the following "double-surrogate" function:

$$\phi(\mu; \tilde{\mu}, \bar{\mu}) \triangleq \phi_L(\mu; \tilde{\mu}) + \phi_R(\mu; \bar{\mu}). \quad (23)$$

By construction, this quadratic surrogate has the following properties: For a conventional regularized ordered-subsets method, the minimization step for each subset is given as follows:

$$\mu^{(n,m)} = \text{argmin}_\mu \phi_m(\mu; \mu^{(n,m-1)}, \mu^{(n,m-1)}) \quad (24)$$

$$= \mu^{(n,m-1)} - [D_L(\mu^{(n,m-1)}) + D_R(\mu^{(n,m-1)})]^{-1}(D_m\nabla\Phi_L(\mu^{(n,m-1)}) + \nabla\Phi_R(\mu^{(n,m-1)})),$$

-continued $$\mu^{(n,0)} := \mu^{(n)}, \mu^{(n+1)} := \mu^{(n,M)}, \quad (25)$$

for m=1, . . . , M denoting the index of the subset. Each iteration indexed by n of ordered-subsets involves M sub-iterations. This iteration is undesirably slow because it computes the regularization gradient $\nabla\Phi_R$ for every subset. To reduce this expense, it is proposed to exploit the generality of the double surrogate Equation 23 by using the following novel update:

$$\mu^{(n,m)} = \mathrm{argmin}_\mu \phi_m(\mu; \mu^{(n,m-1)}, \mu^{(n)}) \quad (26)$$

$$= D_\phi(\mu^{(n,m-1)}, \mu^{(n)})(D_L(\mu^{(n,m-1)})\mu^{(n,m-1)} + D_R(\mu^{(n)})\mu^{(n)} - D_m\nabla\Phi_L(\mu^{(n,m-1)}) - \nabla\Phi_R(\mu^{(n)}))$$

$$= \mu^{(n,m-1)} - D_\phi(\mu^{(n,m-1)}, \mu^{(n)})(D_m\nabla\Phi_L(\mu^{(n,m-1)}) + \nabla\Phi_R(\mu^{(n)}) + \underbrace{D_R(\mu^{(n)})(\mu^{(n,m-1)} - \mu^{(n)})}_{\text{new term}}) \quad (27)$$

where $D_\phi(\mu^{(n,m-1)},\mu^{(n)})=[D_L(\mu^{(n,m-1)})+D_R(\mu^{(n)})]^{-1}$. This new iteration Equation 27 utilizes the same regularizer gradient for all subsets. Compared to Equation 24, the updates in Equation 27 are relatively similar except for an extra term that compensates for not updating the regularizer gradient. However, this extra term has simpler operations (e.g., additions, subtractions, divisions, and/or multiplications) and hence is faster to compute. In the above description, the regularizer gradient was updated only after all subsets were updated. This implies computing the gradient once in the beginning of each iteration and re-using this calculation for all the subsets, instead of computing the gradient M times for each iteration in the original OS method described in Equation 24. Obviously, the regularizer gradient can be updated as frequently as needed and the update frequency is denoted as $U_f$. Updating the regularizer gradient less often reduces the computational cost at the expense of the convergence rate in early iterations.

The OS-SPS algorithm described above was investigated on a 3D cone-beam CT image reconstruction problem with limited view angles.

To assess the convergence speed of the method 400, we computed the root mean squared difference between the image estimate at the nth iteration, $\mu^{(n)}$, with both the fully converged solution, $\mu^{(\infty)}$, and true image, $\mu^{(true)}$.

Figure 10:
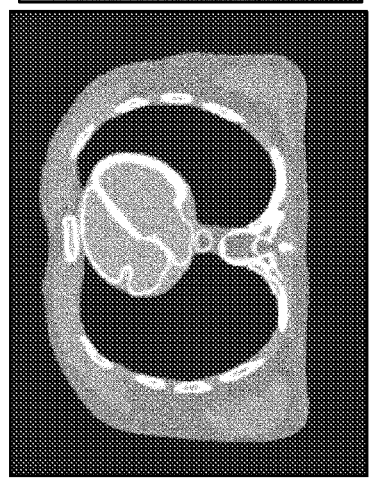
FIG. 10 is a visual representation of a variety of images generated using an exemplary OS-SPS algorithm associated with the method of FIG. 9.
Figure 10:
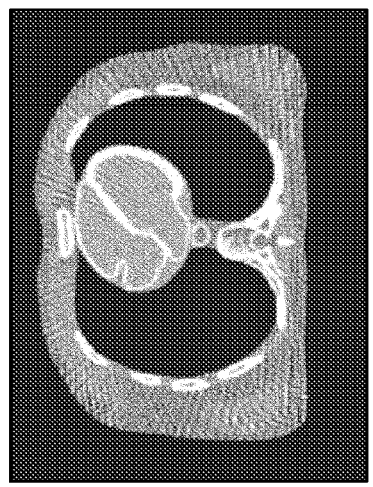
Figure 10:
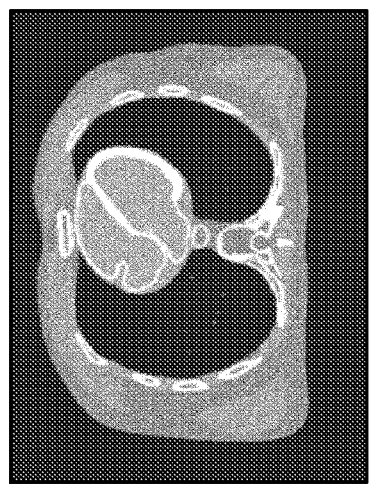

This type of "relaxed" OS is guaranteed to converge because the final stage uses just 1 subset for which Equation 24 is convergent. FIG. 10 illustrates the images of the true phantom, the FBP reconstruction, and the fully converged image ($\mu^{(\infty)}$) from cone-beam CT data with 164 projection views.

The projections were divided into 41 subsets, which correspond to 4 views per subset. This is a rather aggressive selection compared to conventional choices to try to accelerate convergence relatively significantly.

Figure 11:
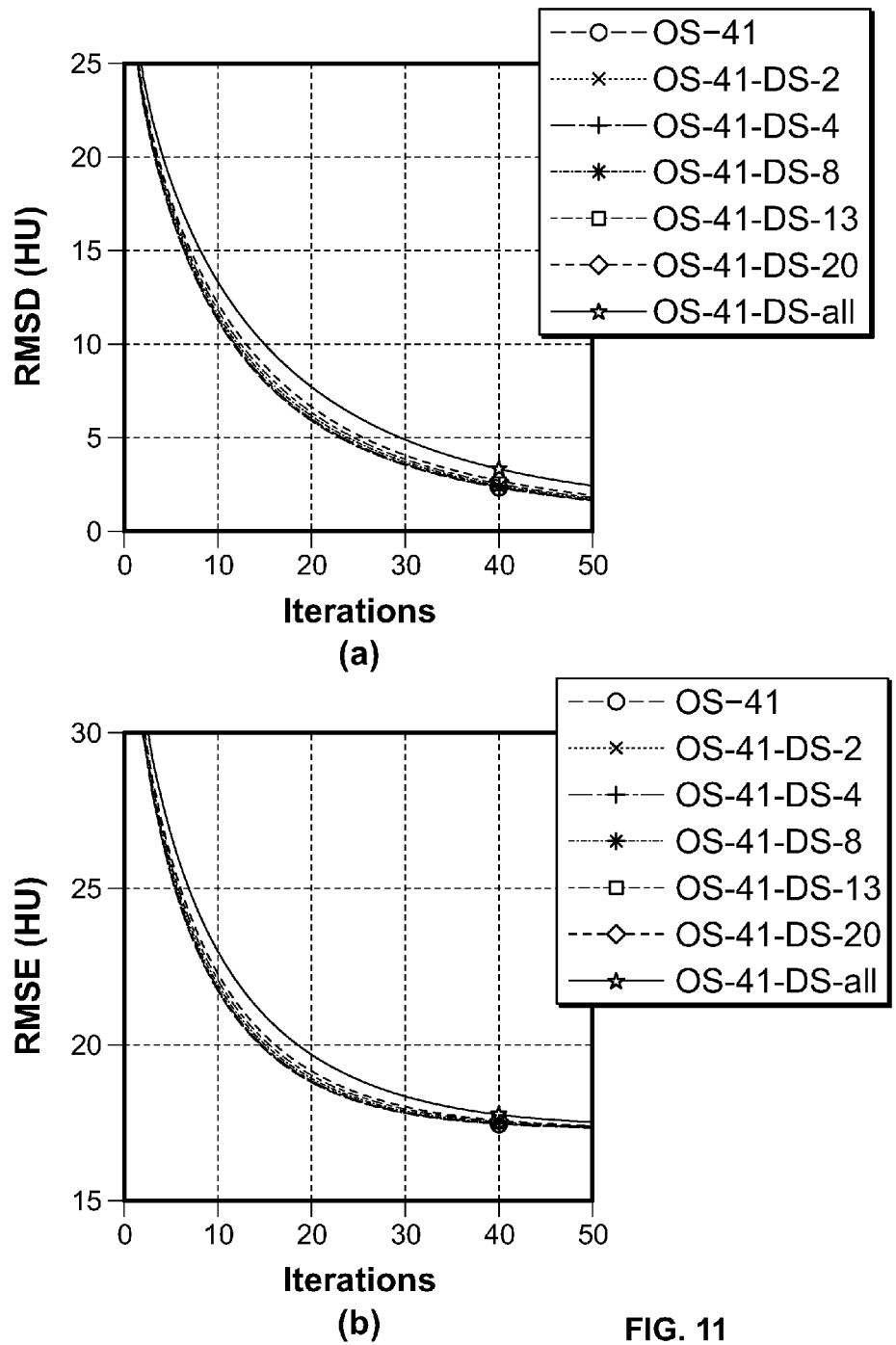
FIG. 11 is a graph illustrating convergence rates associated with the exemplary OS-SPS algorithm associated with the method of FIG. 9.

The regularizer gradient was updated at different frequencies to see the effect on convergence and computation time. FIG. 11 illustrates convergence rates at each iteration for different regularizer update frequencies. Within FIG. 11, OS-41-DS-n indicates OS with 41 subsets and $U_f$=n, and "n=all" means only updating once after all subset updates are done. FIG. 11(a) illustrates $\mu^{(n)}$ with respect to $\mu^{(\infty)}$, and FIG. 11(b) illustrates $\mu^{(n)}$ with respect to $\mu^{(true)}$. FIG. 11 shows that the exemplary OS-SPS algorithm associated with the method 400 gives similar root-mean-square (RMS) differences as the conventional OS even when the regularizer is updated relatively infrequently per iteration.

Figure 12:
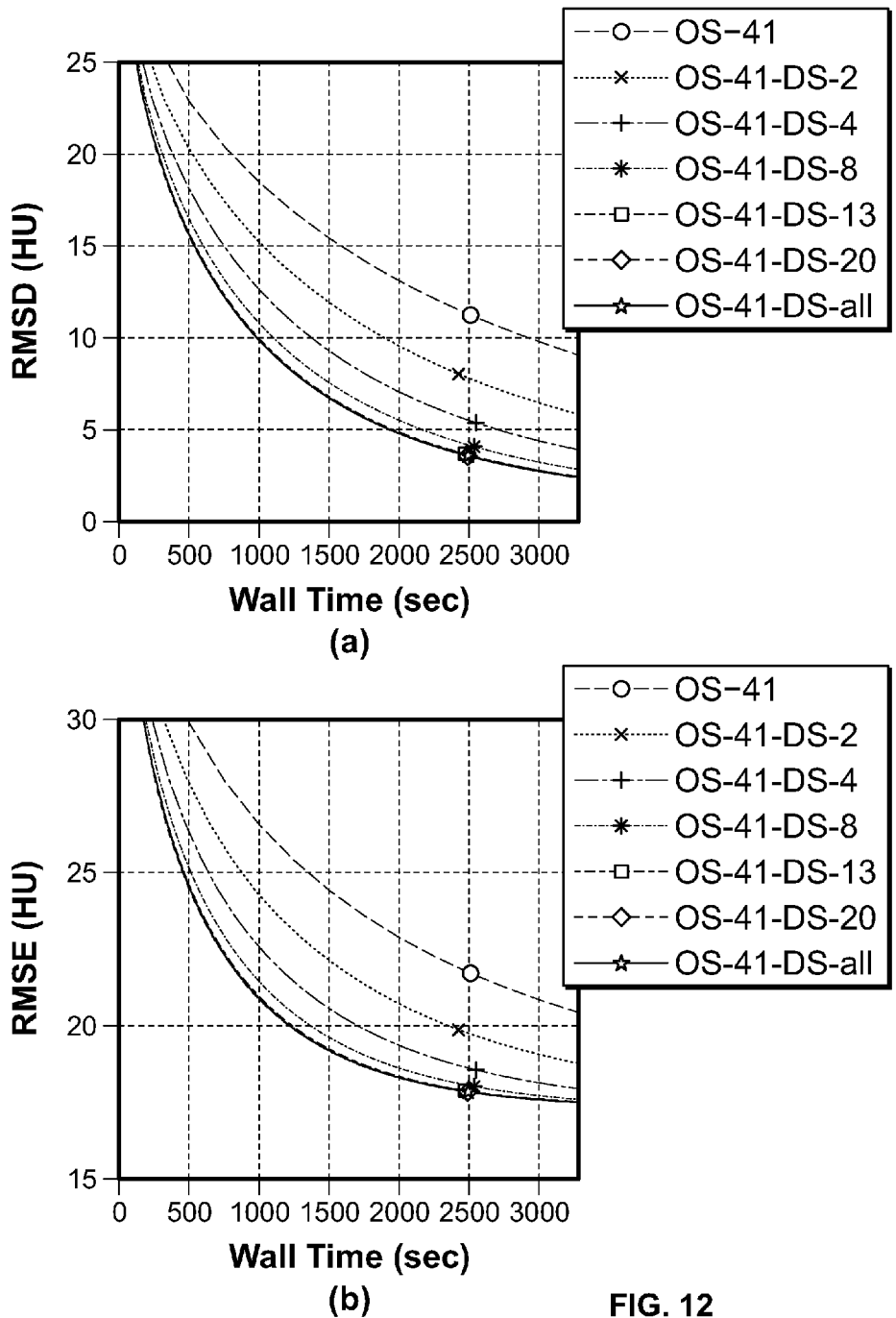
FIG. 12 is another graph illustrating convergence rates associated with the exemplary OS-SPS algorithm associated with the method of FIG. 9.

On the other hand, FIG. 12 shows that the computational expense required to obtain the same level of RMS differences was reduced by the exemplary OS-SPS algorithm associated with the method 400. FIG. 12 illustrates convergence rate versus computation time for different regularizer update frequencies. FIG. 12(a) illustrates $\mu^{(n)}$ with respect to $\mu^{(\infty)}$, and FIG. 12(b) illustrates $\mu^{(n)}$ with respect to $\mu^{(true)}$. With $U_f$=13, which gave the best result in this case, the exemplary OS-SPS algorithm associated with the method 400 converges about 3 times faster than the conventional OS.

Figure 13:
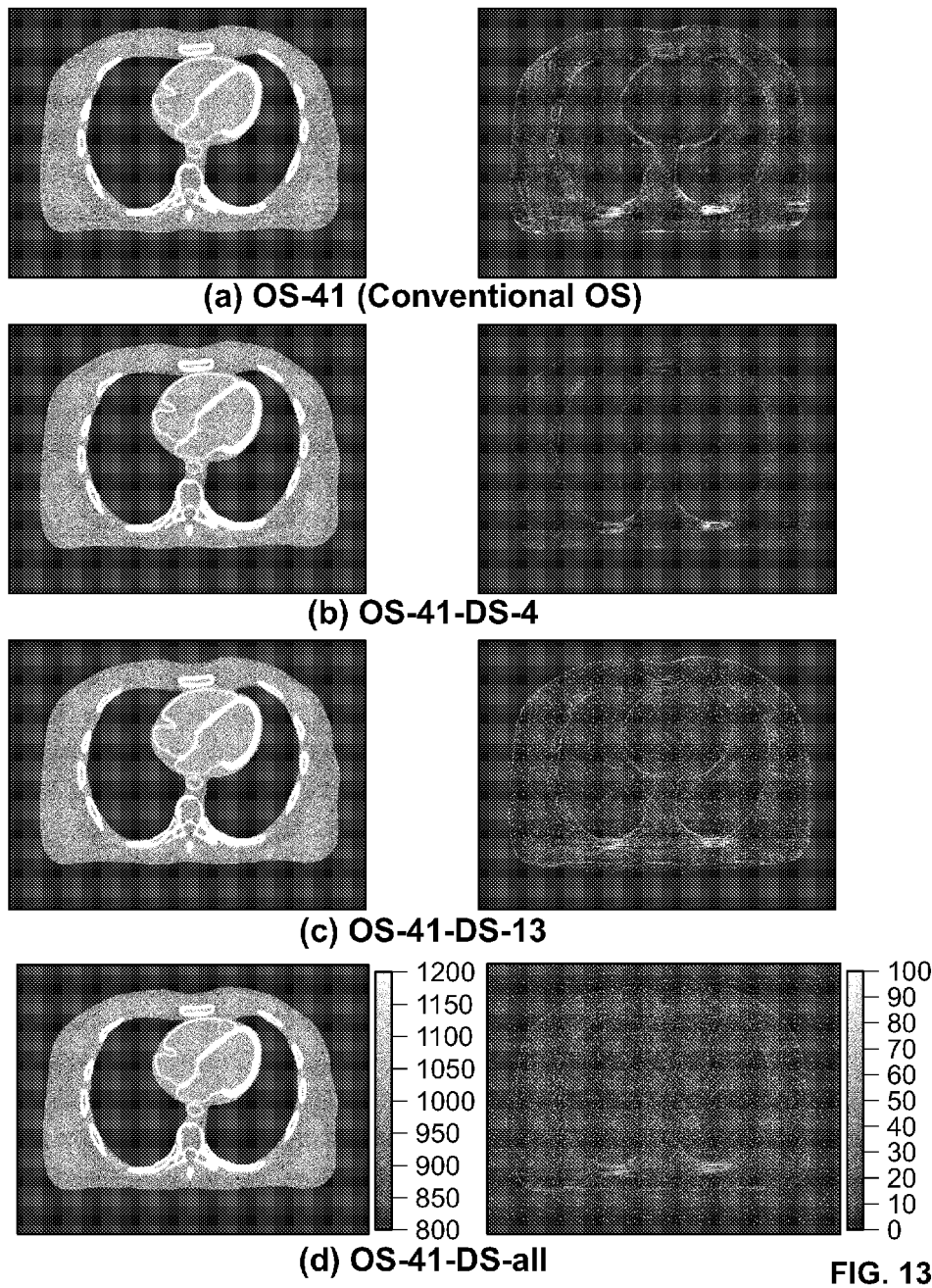
FIG. 13 is a visual representation of a variety of images generated using the exemplary OS-SPS algorithm associated with the method of FIG. 9.

FIG. 13 compares the convergence speed of OSDS with different update frequencies. In the left column, FIG. 13 illustrates images that are at the same time point (4000 seconds after initialization). In the right column, FIG. 13 illustrates absolute difference images with respect to $\mu^{(\infty)}$. By observing the reconstructed image at the same time point, FIG. 13 clearly shows that the exemplary OS-SPS algorithm associated with the method 400 is converging faster. There are tradeoffs between convergence rates and computational expense, and in the present case calculating the regularizer gradient for every 13 subset updates gave the most efficient results on the processing hardware used for the experiment. For different problems, the optimal update frequency may differ. However, it is noticeable that regardless of the update frequency, the exemplary OS-SPS algorithm associated with the method 400 is converging faster than the conventional OS. As the problem gets larger and the number of subsets increases, the computational expense required to calculate the gradient of the regularizer may become much more dominant. Therefore, relatively substantial benefits can be expected from the method 400.

The methods and algorithms described herein are used to iteratively reconstruct an image of an object. The methods and algorithms may be embodied as a set of instructions that are stored on a computer and implemented using, for example, a module 530, shown in FIG. 13, software, hardware, a combination thereof, and/or a tangible non-transitory computer readable medium. In one embodiment, a tangible non-transitory computer readable medium excludes signals.

As used herein, the concept of using coefficient maps to improve the convergence and the image quality (e.g., as discussed in paragraph [0025]) is not limited to model-based cost functions, but rather is applicable to all simultaneous algorithms solving model-based as well as non-model based cost functions.

Figure 14:
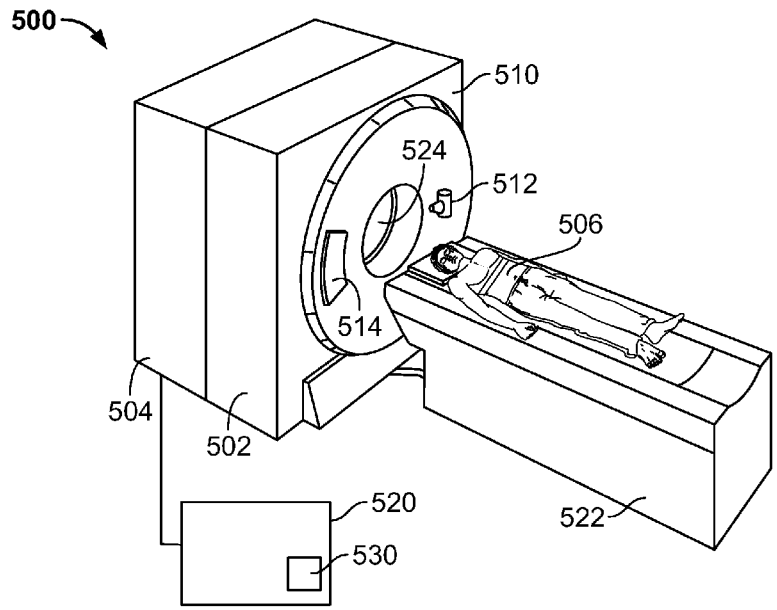
FIG. 14 is a pictorial view of an exemplary multi-modality imaging system formed in accordance with various embodiments.
Figure 15:
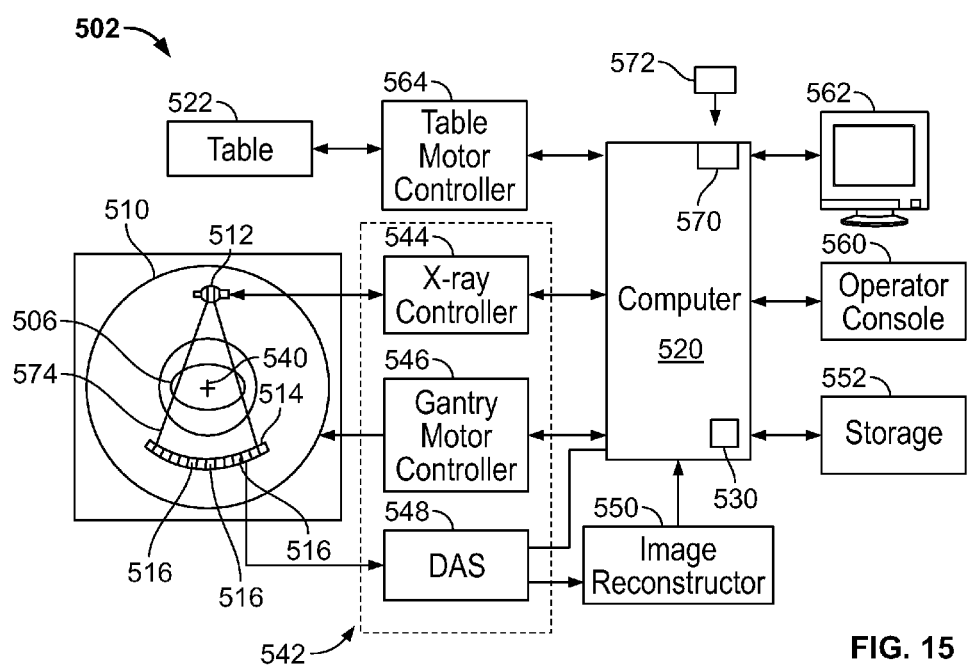
FIG. 15 is a block schematic diagram of the system illustrated in FIG. 14.

FIG. 14 is a pictorial view of an exemplary imaging system 500 that is formed in accordance with various embodiments. FIG. 15 is a block schematic diagram of a portion of the multi-modality imaging system 500 shown in FIG. 14. The imaging system may be embodied as a computed tomography (CT) imaging system, a positron emission tomography (PET) imaging system, a magnetic resonance imaging (MRI) system, an ultrasound imaging system, an x-ray imaging system, a single photon emission computed tomography (SPECT) imaging system, an interventional C-Arm tomography imaging system, a CT system for a dedicated purpose such as extremity or breast scanning, and combinations thereof, among others. In the exemplary embodiment, the method 100 is described with respect to a CT imaging system. Moreover, in the exemplary embodiment, the cost function is used to explain the various embodiments described herein.

Although various embodiments are described in the context of an exemplary dual modality imaging system that includes a computed tomography (CT) imaging system and a positron emission tomography (PET) imaging system or a single photon emission computed tomography (SPECT) system, it should be understood that other imaging systems capable of performing the functions described herein are contemplated as being used.

The multi-modality imaging system 500 is illustrated, and includes a CT imaging system 502 and a PET imaging system 504. The imaging system 500 allows for multiple scans in different modalities to facilitate an increased diagnostic capability over single modality systems. In one embodiment, the exemplary multi-modality imaging system 500 is a CT/PET imaging system 500. Optionally, modalities other than CT and PET are employed with the imaging system 500. For example, the imaging system 500 may be a standalone CT imaging system, a standalone PET imaging system, a magnetic resonance imaging (MRI) system, an ultrasound imaging system, an x-ray imaging system, and/or a single photon emission computed tomography (SPECT) imaging system, interventional C-Arm tomography, CT systems for a dedicated purpose such as extremity or breast scanning, and combinations thereof, among others.

The CT imaging system 502 includes a gantry 510 that has an x-ray source 512 that projects a beam of x-rays toward a detector array 514 on the opposite side of the gantry 510. The detector array 514 includes a plurality of detector elements 516 that are arranged in rows and channels that together sense the projected x-rays that pass through an object, such as the subject 506. The imaging system 500 also includes a computer 520 that receives the projection data from the detector array 514 and processes the projection data to reconstruct an image of the subject 506. In operation, operator supplied commands and parameters are used by the computer 520 to provide control signals and information to reposition a motorized table 522. More specifically, the motorized table 522 is utilized to move the subject 506 into and out of the gantry 510. Particularly, the table 522 moves at least a portion of the subject 506 through a gantry opening 524 that extends through the gantry 510.

The imaging system 500 also includes a module 530 that is configured to implement various methods and algorithms described herein. The module 530 may be implemented as a piece of hardware that is installed in the computer 520. Optionally, the module 530 may be implemented as a set of instructions that are installed on the computer 520. The set of instructions may be stand alone programs, may be incorporated as subroutines in an operating system installed on the computer 520, may be functions in an installed software package on the computer 520, and the like. It should be understood that the various embodiments are not limited to the arrangements and instrumentality shown in the drawings.

As discussed above, the detector 514 includes a plurality of detector elements 516. Each detector element 516 produces an electrical signal, or output, that represents the intensity of an impinging x-ray beam and hence allows estimation of the attenuation of the beam as it passes through the subject 506. During a scan to acquire the x-ray projection data, the gantry 510 and the components mounted thereon rotate about a center of rotation 540. FIG. 15 shows only a single row of detector elements 516 (i.e., a detector row). However, the multislice detector array 514 includes a plurality of parallel detector rows of detector elements 516 such that projection data corresponding to a plurality of slices can be acquired simultaneously during a scan.

Rotation of the gantry 510 and the operation of the x-ray source 512 are governed by a control mechanism 542. The control mechanism 542 includes an x-ray controller 544 that provides power and timing signals to the x-ray source 512 and a gantry motor controller 546 that controls the rotational speed and position of the gantry 510. A data acquisition system (DAS) 548 in the control mechanism 542 samples analog data from detector elements 516 and converts the data to digital signals for subsequent processing. For example, the subsequent processing may include utilizing the module 530 to implement the various methods described herein. An image reconstructor 550 receives the sampled and digitized x-ray data from the DAS 548 and performs high-speed image reconstruction. The reconstructed images are input to the computer 520 that stores the image in a storage device 552. Optionally, the computer 520 may receive the sampled and digitized x-ray data from the DAS 548 and perform various methods described herein using the module 530. The computer 520 also receives commands and scanning parameters from an operator via a console 560 that has a keyboard. An associated visual display unit 562 allows the operator to observe the reconstructed image and other data from computer.

The operator supplied commands and parameters are used by the computer 520 to provide control signals and information to the DAS 548, the x-ray controller 544 and the gantry motor controller 546. In addition, the computer 520 operates a table motor controller 564 that controls the motorized table 522 to position the subject 506 in the gantry 510. Particularly, the table 522 moves at least a portion of the subject 506 through the gantry opening 524 as shown in FIG. 14.

Referring again to FIG. 15 in one embodiment, the computer 520 includes a device 570, for example, a floppy disk drive, CD-ROM drive, DVD drive, magnetic optical disk (MOD) device, or any other digital device including a network connecting device such as an Ethernet device for reading instructions and/or data from a computer-readable medium 572, such as a floppy disk, a CD-ROM, a DVD or an other digital source such as a network or the Internet, as well as yet to be developed digital means. In another embodiment, the computer 520 executes instructions stored in firmware (not shown). The computer 520 is programmed to perform functions described herein, and as used herein, the term computer is not limited to just those integrated circuits referred to in the art as computers, but broadly refers to computers, processors, microcontrollers, microcomputers, programmable logic controllers, application specific integrated circuits, and other programmable circuits, and these terms are used interchangeably herein.

In the exemplary embodiment, the x-ray source 512 and the detector array 514 are rotated with the gantry 510 within the imaging plane and around the subject 506 to be imaged such that the angle at which an x-ray beam 574 intersects the subject 506 constantly changes. A group of x-ray attenuation measurements, i.e., projection data, from the detector array 514 at one gantry angle is referred to as a "view". A "scan" of the subject 506 comprises a set of views made at different gantry angles, or view angles, during one revolution of the x-ray source 512 and the detector 514. In a CT scan, the projection data is processed to reconstruct an image that corresponds to a two dimensional slice taken through the subject 506.

Exemplary embodiments of a multi-modality imaging system are described above in detail. The multi-modality imaging system components illustrated are not limited to the specific embodiments described herein, but rather, components of each multi-modality imaging system may be utilized independently and separately from other components described herein. For example, the multi-modality imaging system components described above may also be used in combination with other imaging systems.

It should be noted that the various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid state drive, optical drive, and/or the like. The storage device may also be other similar means for loading computer programs or other instructions into the computer or processor.

As used herein, the term "computer" may include any processor-based or microprocessor-based system including systems using microcontrollers, reduced instruction set computers (RISC), application specific integrated circuits (ASICs), logic circuits, GPUs, FPGAs, and any other circuit or processor capable of executing the functions described herein. The above examples are exemplary only, and are thus not intended to limit in any way the definition and/or meaning of the term "computer". The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the invention. The set of instructions may be in the form of a software program. The software may be in various forms such as system software or application software, which may be a non-transitory computer readable medium. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Also as used herein, the phrase "reconstructing an image" is not intended to exclude embodiments of the present invention in which data representing an image is generated, but a viewable image is not. Therefore, as used herein the term "image" broadly refers to both viewable images and data representing a viewable image. However, many embodiments generate, or are configured to generate, at least one viewable image.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A method for iteratively reconstructing an image of an object, the method comprising:
   accessing measurement data associated with the image, the measurement data obtained from a detector array; and
   using, with a computer operably coupled to the detector array, a simultaneous algorithm to reconstruct the image, wherein using the simultaneous algorithm to reconstruct the image comprises:
determining, with the computer, a scaling factor that is voxel-dependent; and
applying, with the computer, the voxel-dependent scaling factor to a gradient of an objective function to reconstruct the image.

2. The method of claim 1, wherein determining a scaling factor that is voxel-dependent comprises computing the scaling factor directly based on acquisition geometry.

3. The method of claim 1, wherein determining a scaling factor that is voxel-dependent comprises computing the scaling factor directly based on acquisition geometry, the measurement data being non-uniformly sampled in a three-dimensional (3D) acquisition geometry.

4. The method of claim 1, wherein determining a scaling factor that is voxel-dependent comprises generating an coefficient map and using the coefficient map to compute the voxel-dependent scaling factor.

5. The method of claim 4, wherein generating an coefficient map comprises transforming an update obtained from a difference of one of at least two iterations or at least two sub-iterations.

6. The method of claim 4, wherein generating an coefficient map comprises generating an coefficient map that is locally smooth and is capable of being low-pass filtered.

7. The method of claim 4, wherein generating an coefficient map comprises obtaining the coefficient map from an initial image.

8. The method of claim 4, wherein generating an coefficient map comprises augmenting the coefficient map with at least one of prior information about an initial image, a feature of a current image, or acquisition geometry.

9. The method of claim 1, wherein applying the voxel-dependent scaling factor to a gradient of an objective function to reconstruct the image comprises scaling the gradient using the voxel-dependent scaling factor.

10. The method of claim 9, wherein the scaling is at least one of obtained using $A^T W A$ or linked to contribution of subsets to every voxel.

11. The method of claim 1, wherein applying the voxel-dependent scaling factor to a gradient of an objective function to reconstruct the image comprises computing a relaxation factor for each slice of the measurement data, the measurement data being non-uniformly sampled in a three-dimensional (3D) acquisition geometry wherein slices inside a region of interest (ROI) are sampled by a different number of views compared to slices outside the ROI.

12. The method of claim 1, wherein applying the voxel-dependent scaling factor to a gradient of an objective function to reconstruct the image comprises updating the voxel-dependent scaling factor at a frequency that is reduced to every n-th iteration instead of every iteration.

13. The method of claim 4, wherein the coefficient map is down-sampled.

14. An imaging system comprising:
a detector array; and
a computer coupled to the detector array, the computer configured to:
access measurement data associated with an image of an object; and
use a simultaneous algorithm to reconstruct the image, wherein the computer is configured to use the simultaneous algorithm to reconstruct the image by determining a scaling factor that is voxel-dependent and applying the voxel-dependent scaling factor to a gradient of an objective function to reconstruct the image.

15. The imaging system of claim 14, wherein the computer is configured to determine the scaling factor that is voxel-dependent by computing the scaling factor directly based on acquisition geometry.

16. The imaging system of claim 14, wherein the computer is configured to determine the scaling factor that is voxel-dependent by generating an coefficient map and using the coefficient map to compute the voxel-dependent scaling factor.

17. The imaging system of claim 16, wherein the computer is configured to generate the coefficient map by transforming an update obtained from a difference of one of at least two iterations or at least two sub-iterations, the transformation being one of discrete or continuous.

18. The imaging system of claim 14, wherein the computer is configured to apply the voxel-dependent scaling factor to the gradient of the objective function by scaling the gradient using the voxel-dependent scaling factor.

19. The imaging system of claim 14, wherein the computer is configured to apply the voxel-dependent scaling factor to the gradient of the objective function by computing a relaxation factor for each slice of the measurement data, the measurement data being non-uniformly sampled in a three-dimensional (3D) acquisition geometry wherein slices inside a region of interest (ROI) are sampled by a different number of views compared to slices outside the ROI.

* * * * *